United States Patent
Otomo et al.

(10) Patent No.: US 9,459,870 B2
(45) Date of Patent: Oct. 4, 2016

(54) DATA PROCESSOR

(71) Applicant: FUJITSU LIMITED, Kawasaki-shi, Kanagawa (JP)

(72) Inventors: Toshiya Otomo, Kawasaki (JP); Koichiro Yamashita, Hachioji (JP); Takahisa Suzuki, Yokohama (JP); Hiromasa Yamauchi, Usakos (NA); Koji Kurihara, Kawasaki (JP); Yuta Teranishi, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 186 days.

(21) Appl. No.: 14/499,334

(22) Filed: Sep. 29, 2014

(65) Prior Publication Data

US 2015/0019837 A1    Jan. 15, 2015

Related U.S. Application Data

(63) Continuation of application No. PCT/JP2012/058652, filed on Mar. 30, 2012.

(51) Int. Cl.
*G06F 9/30* (2006.01)
*G06F 9/34* (2006.01)
*G06F 15/167* (2006.01)

(52) U.S. Cl.
CPC ............ *G06F 9/30043* (2013.01); *G06F 9/30* (2013.01); *G06F 9/30036* (2013.01); *G06F 9/34* (2013.01); *G06F 15/167* (2013.01)

(58) Field of Classification Search
None
See application file for complete search history.

(56) References Cited

U.S. PATENT DOCUMENTS

| 7,032,099 B1 * | 4/2006 | Imamura | G06F 9/52 712/29 |
| 8,464,035 B2 * | 6/2013 | Dixon | G06F 1/3203 713/1 |
| 8,688,883 B2 * | 4/2014 | Guddeti | G06F 13/24 710/260 |
| 2010/0299541 A1 | 11/2010 | Ishikawa et al. | |

FOREIGN PATENT DOCUMENTS

| JP | 03-028957 | 2/1991 |
| JP | 05-189247 | 7/1993 |

(Continued)

OTHER PUBLICATIONS

Notification of Transmittal of Translation of the International Preliminary Report on Patentability (Form PCT/IB/338, Form PCT/IB/373 & Form PCT/ISA/237), PCT/JP2012/058652, 8 pages, dated Oct. 9, 2014.

(Continued)

*Primary Examiner* — Eric Coleman
(74) *Attorney, Agent, or Firm* — Fujitsu Patent Center

(57) ABSTRACT

A data processor includes: a plurality of controllers that process data; a program memory that stores a standby instruction and a data processing instruction at a plurality of addresses respectively; and a queue that stores different execution start addresses for the plurality of controllers, wherein after the plurality of controllers sequentially access the queue, the plurality of controllers acquire the different execution start addresses from the queue in an order of the sequential access, start execution of instructions from the acquired different execution start addresses in the program memory, and execute the data processing instruction and execute the standby instruction the number of times different for each of the controllers.

8 Claims, 6 Drawing Sheets

(56) References Cited

FOREIGN PATENT DOCUMENTS

| JP | 11-031068 | 2/1999 |
| JP | 11-045209 | 2/1999 |
| JP | 2000-163119 | 6/2000 |
| JP | 2010-271930 | 12/2010 |
| JP | 2011-233071 | 11/2011 |

OTHER PUBLICATIONS

International Search Report, mailed in connection with PCT/JP2012/058652 and mailed Jul. 3, 2012.

* cited by examiner

F I G. 4
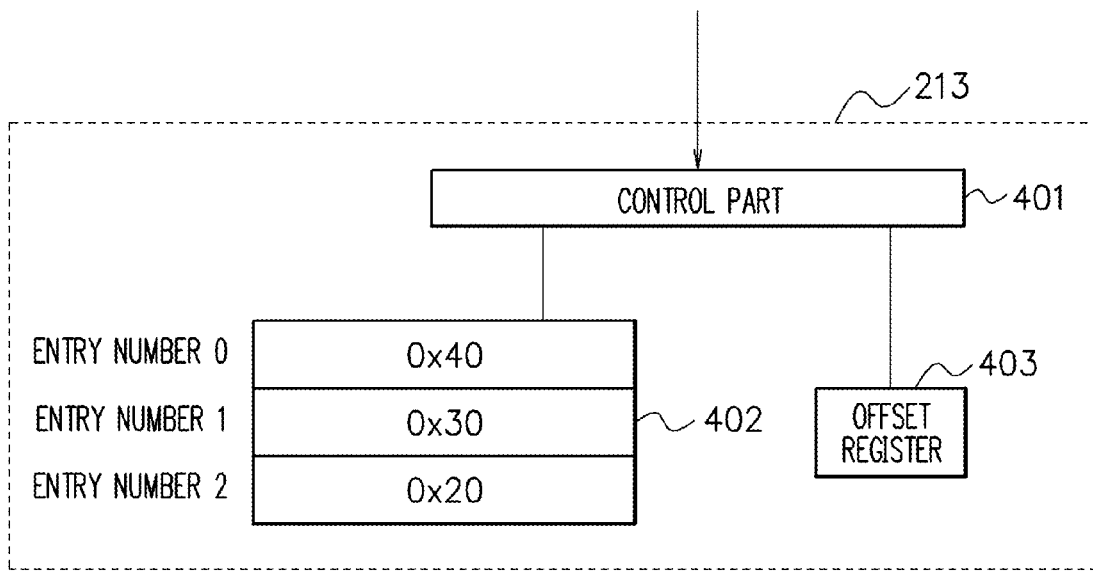

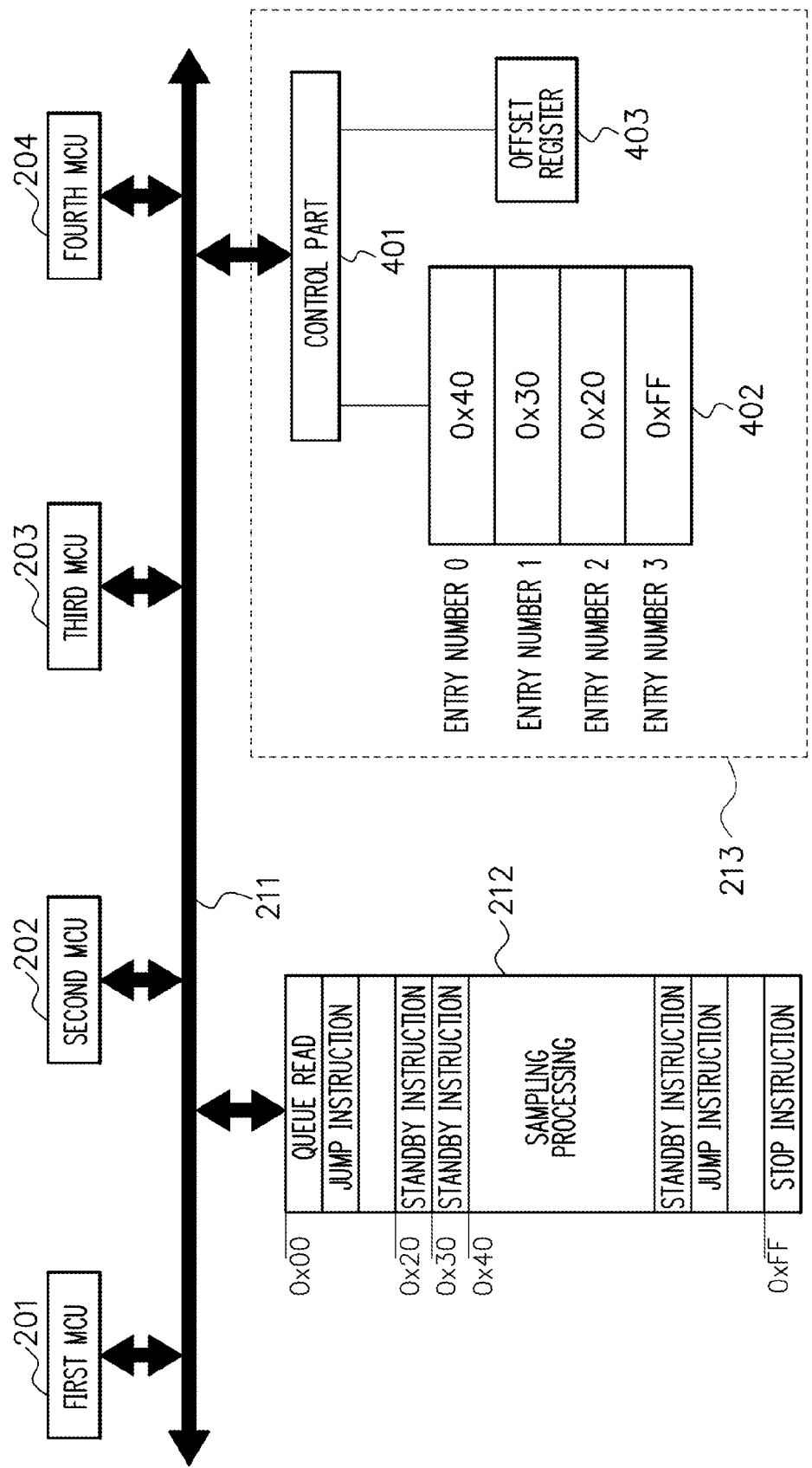

DATA PROCESSOR

CROSS-REFERENCE TO RELATED APPLICATION

This application is a continuation application of International Application PCT/JP2012/058652 filed on Mar. 30, 2012 and designated the U.S., the entire contents of which are incorporated herein by reference.

FIELD

The embodiments discussed herein are directed to a data processor.

BACKGROUND

There is a known reset vector switching method of preparing at least two external pins operated for instructing to reset hardware and start boot access from a predetermined address, selectively operating the external pins to read a reset vector address corresponding to the external pin, and starting the boot access from the address (refer to, for example, Patent Document 1).

PRIOR ART DOCUMENT

Patent Document

[Patent Document 1] Japanese Laid-open Patent Publication No. 11-31068

In the case of processing in parallel the sampling processings using a multiprocessor, it is necessary to shift processing start timings of processors by a sampling period. In this case, the above-described processings can be implemented by synchronizing the processors using a sophisticated hardware managing mechanism such as an operating system (OS) and starting the processings after standing by for a sampling period. However, the implementation method is made on the assumption of hardware resources to the extent that the OS operates.

SUMMARY

A data processor includes: a plurality of controllers that process data; a program memory that stores a standby instruction and a data processing instruction at a plurality of addresses respectively; and a queue that stores different execution start addresses for the plurality of controllers, wherein after the plurality of controllers sequentially access the queue, the plurality of controllers acquire the different execution start addresses from the queue in an order of the sequential access, start execution of instructions from the acquired different execution start addresses in the program memory, and execute the data processing instruction and execute the standby instruction the number of times different for each of the controllers.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 4 is a diagram illustrating a configuration example of a queue in FIG. 2;

FIG. 7 is a diagram illustrating a configuration example of an MCU group according to a second embodiment.

DESCRIPTION OF EMBODIMENTS

First Embodiment

Figure 1:
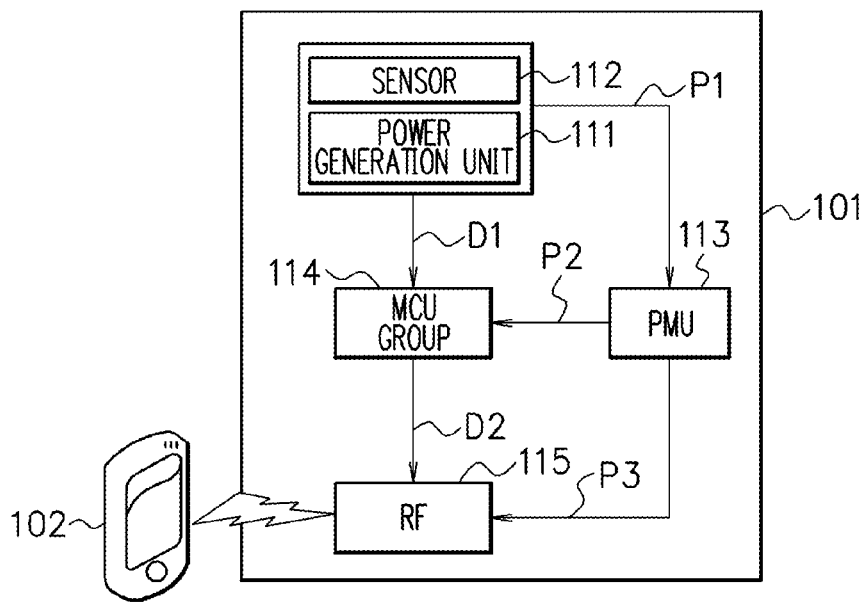
FIG. 1 is a diagram illustrating a configuration example of a data processor according to a first embodiment.

FIG. 1 is a diagram illustrating a data processor 101 according to a first embodiment. A data processor 102 is a master data processor (portable terminal), and the data processor 101 is a slave data processor (sensor node). The data processor 101 has a sensor 112 and can wirelessly transmit sensing data to the data processor 102.

The data processor 101 has a power generation unit 111, the sensor 112, a power management unit (PMU) 113, a micro controller unit (MCU) group 114, and a radio frequency (RF) circuit 115.

The power generation unit 111 is, for example, an environment power generation (energy harvester) unit which converts natural energy into power P1 and outputs the power P1 to the PMU 113. Here, the natural energy is solar energy, radio wave energy of a cellular phone or the like, temperature difference energy or the like. The power generation unit 111 uses the natural energy, and can thus generate merely low power P1 and generate, for example, power at a voltage of 2 to 3 V at peak-to-peak and several tens µW.

The sensor 112 detects various kinds of sensing data D1 and outputs the sensing data D1 to the MCU group 114. For example, the sensor 112 detects temperature or detects components of a ratio wave or the like. Note that the sensor 112 may be integrated with the power generation unit 111 or separated from the power generation unit 111.

The PMU 113 receives input of the power P1 supplied from the power generation unit 111 and manages power P2 to be supplied to the MCU group 114 and power P3 to be supplied to the RF circuit 115. For example, when a predetermined condition is satisfied, the PMU 113 supplies the power P2 and the power P3 to the MCU group 114 and the RF circuit 115 respectively.

The MCU group 114 has a plurality of MCUs which process the sensing data D1 and output transmission data D2 to the RF circuit 115. For example, the MCU group 114 samples analog sensing data D1 to generate digital transmission data D2.

The RF circuit 115 converts the transmission data D2 into a radio-frequency signal and wirelessly transmits the high-frequency signal to the data processor 102.

Figure 2:
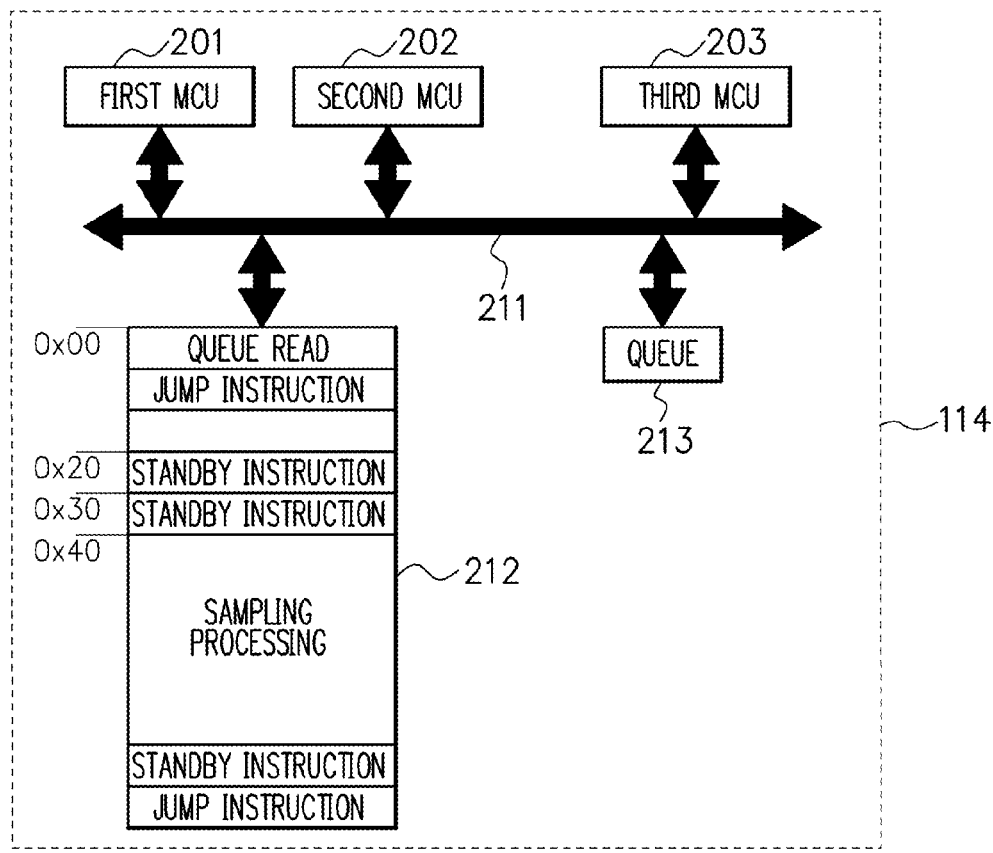
FIG. 2 is a diagram illustrating a configuration example of an MCU group in FIG. 1.

FIG. 2 is a diagram illustrating a configuration example of the MCU group 114 in FIG. 1. The MCU group 114 has a first MCU 201, a second MCU 202, a third MCU 203, a bus 211, a program memory 212 and a queue 213. As described above, the power that the power generation unit 111 can generate is limited power. To achieve a target processing performance under such a situation, the data processor 101 has a microprocessor configuration with a high power performance ratio. The microprocessor configuration has a plurality of MCUs 201 to 203.

Figure 3:
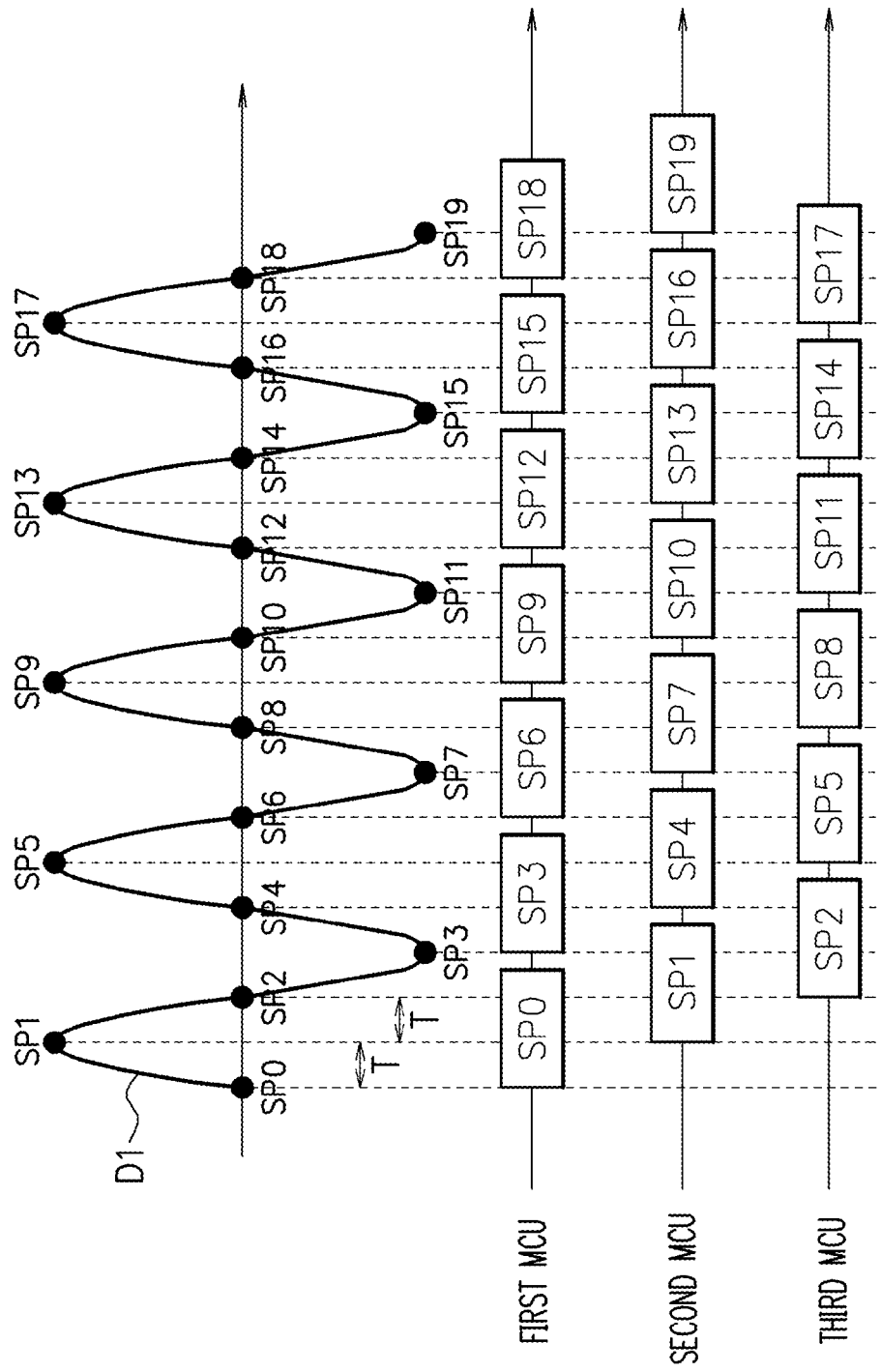
FIG. 3 is a timing chart illustrating processing examples of a first MCU, a second MCU, and a third MCU in FIG. 2.

FIG. 3 is a timing chart illustrating processing examples of the first MCU 201, the second MCU 202, and the third MCU 203 in FIG. 2. The first MCU 201, the second MCU 202, and the third MCU 203 perform parallel processing to sample the analog sensing data D1 in a desired sampling period of T and generate the transmission data D2.

The first MCU 201 starts the sampling processing from a sampling point SP0 of the analog sensing data D1. The second MCU 202 starts the sampling processing from a sampling point SP1 of the analog sensing data D1. The sampling point SP1 is a sampling point at a timing delayed by a time of T from the sampling point SP0. The third MCU 203 starts the sampling processing from a sampling point SP2 of the analog sensing data D1. The sampling point SP2 is a sampling point at a timing delayed by the time of T from the sampling point SP1.

The first MCU 201 samples the analog sensing data D1 in a sampling period of 3×T at sampling points SP0, SP3, SP6, SP9, SP12, SP15 and SP18.

The second MCU 202 samples the analog sensing data D1 in a sampling period of 3×T at sampling points SP1, SP4, SP7, SP10, SP13, SP16 and SP19.

The third MCU 203 samples the analog sensing data D1 in a sampling period of 3×T at sampling points SP2, SP5, SP8, SP11, SP14, and SP17.

As a result, the MCU group 114 can generate data at the 20 sampling points SP0 to SP19 as the transmission data D2. The sampling period of the 20 sampling points SP0 to SP19 is T.

As described above, the first MCU 201, the second MCU 202, and the third MCU 203 can perform the parallel processing to sample the analog sensing data D1 in the desired sampling period of T and generate the transmission data D2.

The sampling processing timings of the first MCU 201, the second MCU 202, and the third MCU 203 are mutually shifted by the time of T. A method of shifting the sampling processing timing by the time of T will be described below.

The shift by the time of T is made possible by using hardware for measuring time or software of performing synchronous processing. However, this method requires a complicated hardware configuration or a large storage capacity of a memory for storing complicated software. This method can be realized by a relatively large data processor such as a smartphone or the like having an operating frequency of 1 GHz or more, a power consumption of about 1 W, and a die size of a semiconductor chip of 100 to several hundreds mm².

However, the data processor 101 in FIG. 1 uses the power generation unit 111 for the natural energy and is thus a relatively micro-miniature data processor having an operating frequency of several tens MHz, a power consumption of several tens μW, and a die size of a semiconductor chip of several tens mm². In the data processor 101, the method of using the above-described complicated hardware or complicated software cannot be employed. Hereinafter, a method of shifting the processings by the first MCU 201, the second MCU 202, and the third MCU 203 by the sampling period of T with a simple configuration will be described.

In FIG. 2, the program memory 212 stores a queue read instruction at an address No. 0 (hexadecimal number), stores a jump instruction at an address next thereto, stores a standby instruction at an address No. 20 (hexadecimal number), stores a standby instruction at an address No. 30 next thereto, stores a sampling processing (data processing) instruction at an address No. 40 (hexadecimal number) next thereto, stores a standby instruction at an address next thereto, and stores a "instruction to jump to No. 40 (hexadecimal number)" at an address next thereto. The first MCU 201, the second MCU 202, and the third MCU 203 share the one program memory 212, thereby making it possible to reduce the capacity of the program memory 212.

FIG. 4 is a diagram illustrating a configuration example of the queue 213 in FIG. 2. The queue 213 has a control part 401, a storage part 402, and an offset register 403. The storage part 402 is a nonvolatile memory that stores different execution start addresses for the plurality of MCUs 201 to 203 at a plurality of entry numbers "0" to "2". Depending on the order of the MCUs 201 to 203 accessing the queue 213, the execution start addresses at which entry numbers "0" to "2" are decided to be allocated to the MCUs 201 to 203 respectively. For example, a first execution start address No. "40" (hexadecimal number) is stored at the entry number "0", a second execution start address No. "30" (hexadecimal number) is stored at the entry number "1", and a third execution start address No. "20" (hexadecimal number) is stored at the entry number "2". The offset register 403 is a nonvolatile memory that stores one of the entry numbers "0" to "2" in the storage part 402.

Figure 5:
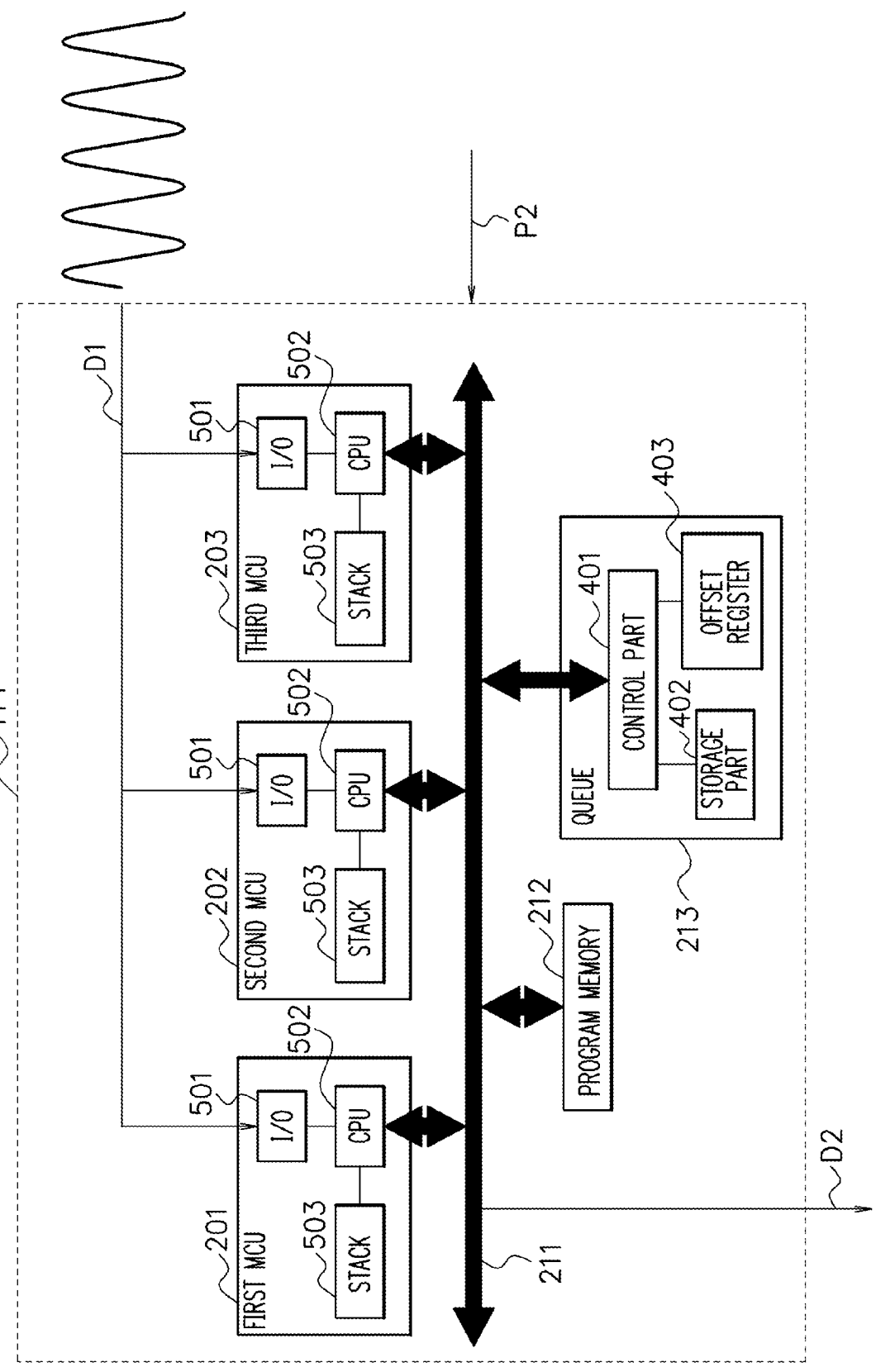
FIG. 5 is a diagram illustrating a configuration example of the MCUs in FIG. 2.

FIG. 5 is a diagram illustrating a configuration example of the MCUs 201 to 203 in FIG. 2. Each of the MCUs 201 to 203 has an input/output (I/O) circuit 501, a central processing unit (CPU) 502, and a stack memory 503. The input/output circuit 501 receives input of the sensing data D1 supplied from the sensor 112, and outputs the sensing data D1 to the central processing unit 502. The stack memory 503 is a working memory area of the central processing unit 502. The central processing unit 502 executes the instruction stored in the program memory 212 using the stack memory 503, to perform processing such as the sampling processing (data processing) or the like in FIG. 3.

Figure 6:
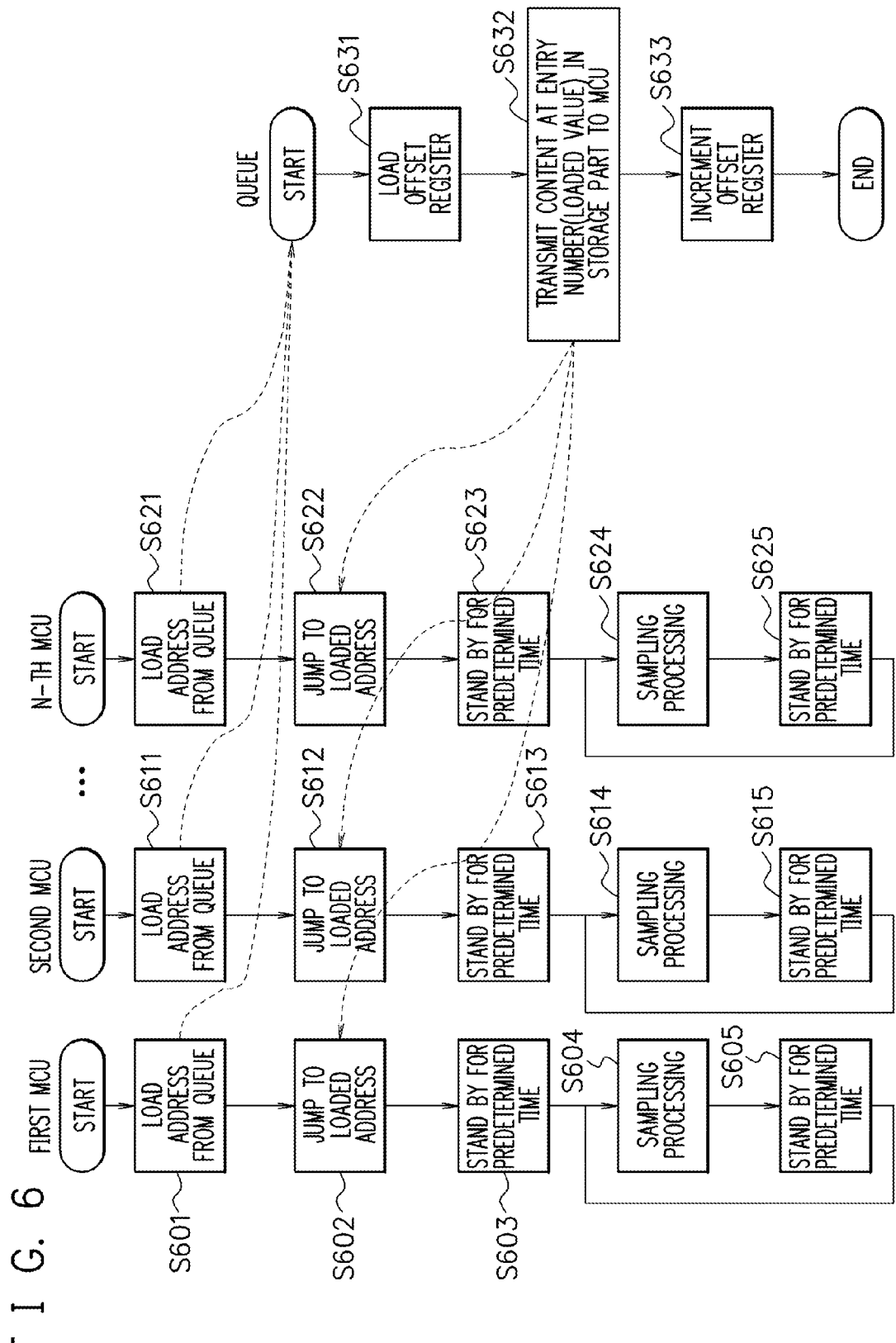
FIG. 6 is a flowchart illustrating processing examples of the first MCU to an N-th MCU and the queue.

FIG. 6 is a flowchart illustrating processing examples of the first MCU to an N-th MCU and the queue 213. Hereinafter, the case where N is three will be described as an example. When a predetermined condition is satisfied, the PMU 113 supplies the power P2 to the MCU group 114 and supplies the power P3 to the RF circuit 115. The predetermined condition is, for example, a condition that the power P1 generated by the power generation unit 111 becomes a threshold value or more, the condition that the sensing data D1 outputted from the sensor 112 falls within a predetermined range or the like.

Each of the MCUs 201 to 203 is initialized at power ON, and reads the instruction from the first address in the program memory 212 and executes the instruction. In other words, when the supply of the power P2 to the MCU group 114 is started, the first MCU 201, the second MCU 202, and the third MCU 203 read the queue read instruction stored at the address No. 0 (hexadecimal number) in the program memory 212 at Steps S601, S611, S621 respectively, and execute the queue read instruction. More specifically, the first MCU 201, the second MCU 202, and the third MCU 203 read the execution start addresses stored in the queue 213. However, since there is only one queue 213, the first MCU 201, the second MCU 202, and the third MCU 203 cannot read the execution start addresses at the same time from the queue 213 but sequentially read the execution start addresses in the access order. Namely, the MCUs 201 to 203 access the queue 213 at about the same time at power ON, and the queue 213 sequentially responds to the accesses from the MCUs 201 to 203.

The first MCU 201 executes, at Step S601, the queue read instruction at the address No. 0 to access the queue 213 in order to load the execution start address from the queue 213.

The second MCU 202 also executes, at Step S611, the queue read instruction at the address No. 0 to access the queue 213 in order to load the execution start address from the queue 213. The third MCU 203 also executes, at Step S621, the queue read instruction at the address No. 0 to access the queue 213 in order to load the execution start address from the queue 213.

For example, a case where the control part 401 in the queue 213 firstly accepts the access from the first MCU 201, secondly accepts the access from the second MCU 202, and thirdly accepts the access from the third MCU 203 will be described as an example.

In this case, the control part 401 in the queue 213 firstly accepts the aforementioned access from the first MCU 201. Then, the control part 401 in the queue 213 loads, at Step S631, the entry number stored in the offset register 403. When the supply of the power P2 is started, the entry number stored in the offset register 403 is initialized to the entry number "0". Accordingly, the control part 401 loads the entry number "0" from the offset register 403, and loads from the storage part 402 the first execution start address No. "40" (hexadecimal number) stored at the loaded entry number "0" in the storage part 402, and transmits the first execution start address No. "40" (hexadecimal number) to the first MCU 201. The first MCU 201 receives, at Step S601, the first execution start address No. "40" (hexadecimal number) from the queue 213. Then, the control part 401 in the queue 213 increments, at Step S633, the entry number in the offset register 403 from "0" to "1".

Next, the control part 401 in the queue 213 accepts the aforementioned access from the second MCU 202. Then, the control part 401 in the queue 213 loads, at Step S631, the entry number "1" stored in the offset register 403, loads from the storage part 402 the second execution start address No. "30" (hexadecimal number) stored at the loaded entry number "1" in the storage part 402, and transmits the second execution start address No. "30" (hexadecimal number) to the second MCU 202. The second MCU 202 receives, at Step S611, the second execution start address No. "30" (hexadecimal number) from the queue 213. Then, the control part 401 in the queue 213 increments, at Step S633, the entry number in the offset register 403 from "1" to "2".

Next, the control part 401 in the queue 213 accepts the aforementioned access from the third MCU 203. Then, the control part 401 in the queue 213 loads, at Step S631, the entry number "2" stored in the offset register 403, loads from the storage part 402 the third execution start address No. "20" (hexadecimal number) stored at the loaded entry number "2" in the storage part 402, and transmits the third execution start address No. "20" (hexadecimal number) to the third MCU 203. The third MCU 203 receives, at Step S621, the third execution start address No. "20" (hexadecimal number) from the queue 213. Then, the control part 401 in the queue 213 increments, at Step S633, the entry number in the offset register 403 from "2" to "3".

When there are N MCUs 201 to 203, the same processing as that described above is repeated up to the N-th MCU. As described above, when sequentially accessed from the plurality of MCUs 201 to 203, the control part 401 reads the execution start address from the entry number, which is stored in the offset register 403, in the storage part 402, outputs the read execution start address to one of the accessing MCUs 201 to 203, and overwrites the entry number stored in the offset register 403 with a next entry number. More specifically, when accessed from one of the MCUs 201 to 203, the control part 401 increments the entry number stored in the offset register 403.

The first MCU 201 executes, at Step S602, the jump instruction at the address next to the "queue read instruction" in the program memory 212 to jump to the first execution start address No. "40" (hexadecimal number) loaded (received) at Step S601. Since the first execution start address No. "40" (hexadecimal number) in the program memory 212 is the sampling processing instruction and is not the standby instruction, the first MCU 201 omits Step S603 and proceeds from Step S602 to Step S604. Note that Step S603 is the processing performed when the order of the first MCU 201 accessing the queue 213 is the second or thereafter. The first MCU 201 executes, at Step S604, the sampling processing (data processing) instruction at the first execution start address No. "40" (hexadecimal number) to perform the sampling processing (data processing) at the sampling point SP0 (FIG. 3) of the sensing data D1, and outputs the transmission data D2 to the RF circuit 115. Then, the first MCU 201 executes, at Step S605, the standby instruction at the next address in the program memory 212 to stand by for a time of about 3×T in FIG. 3. Thereafter, the first MCU 201 executes the "instruction to jump to No. 40 (hexadecimal number)" at the next address in the program memory 212 to jump to No. 40 (hexadecimal number). Then, the first MCU 201 returns to Step S604 and executes the sampling processing (data processing) instruction at No. 40 (hexadecimal number) to perform the sampling processing (data processing) at the sampling point SP3 (FIG. 3) of the sensing data D1, and outputs the transmission data D2 to the RF circuit 115. Then, the first MCU 201 executes, at Step S605, the standby instruction at the next address in the program memory 212 to stand by for a time of about 3×T in FIG. 3. Thereafter, the first MCU 201 executes the "instruction to jump to No. 40 (hexadecimal number)" at the next address in the program memory 212 to jump to No. 40 (hexadecimal number). Then, the first MCU 201 returns to Step S604 and executes the sampling processing (data processing) instruction at No. 40 (hexadecimal number) to perform the sampling processing (data processing) at the sampling point SP6 (FIG. 3) of the sensing data D1, and outputs the transmission data D2 to the RF circuit 115. Hereinafter, by repeating the same processing as described above, the first MCU 201 performs the sampling processing (data processing) at the sampling points SP9, SP12, SP15, SP18 and so on (FIG. 3) of the sensing data D1, and outputs the transmission data D2 to the RF circuit 115. As described above, the first MCU 201 can perform the sampling processing at the sampling points SP0, SP3, SP6, SP9, SP12, SP15, SP18 and so on in a sampling period of 3×T.

The second MCU 202 executes, at Step S612, the jump instruction at the address next to the "queue read instruction" in the program memory 212 to jump to the second execution start address No. "30" (hexadecimal number) loaded (received) at Step S611. Then, the second MCU 202 executes, at Step S613, the standby instruction at the second execution start address No. "30" (hexadecimal number) to stand by for a time of about 3×T in FIG. 3. Then, the second MCU 202 executes, at Step S614, the sampling processing (data processing) instruction at the next address No. "40" (hexadecimal number) to perform the sampling processing (data processing) at the sampling point SP1 (FIG. 3) of the sensing data D1, and outputs the transmission data D2 to the RF circuit 115. Then, the second MCU 202 executes, at Step S615, the standby instruction at the next address in the program memory 212 to stand by for a time of about 3×T in FIG. 3. Thereafter, the second MCU 202 executes the "instruction to jump to No. 40 (hexadecimal number)" at the next address in the program memory 212 to jump to No. 40

(hexadecimal number). Then, the second MCU 202 returns to Step S614 and executes the sampling processing (data processing) instruction at No. 40 (hexadecimal number) to perform the sampling processing (data processing) at the sampling point SP4 (FIG. 3) of the sensing data D1, and outputs the transmission data D2 to the RF circuit 115. Then, the second MCU 202 executes, at Step S615, the standby instruction at the next address in the program memory 212 to stand by for a time of about 3×T in FIG. 3. Thereafter, the second MCU 202 executes the "instruction to jump to No. 40 (hexadecimal number)" at the next address in the program memory 212 to jump to No. 40 (hexadecimal number). Then, the second MCU 202 returns to Step S614 and executes the sampling processing (data processing) instruction at No. 40 (hexadecimal number) to perform the sampling processing (data processing) at the sampling point SP7 (FIG. 3) of the sensing data D1, and outputs the transmission data D2 to the RF circuit 115. Hereinafter, by repeating the same processing as described above, the second MCU 202 performs the sampling processing (data processing) at the sampling points SP10, SP13, SP16, SP19 and so on (FIG. 3) of the sensing data D1, and outputs the transmission data D2 to the RF circuit 115. As described above, the second MCU 202 can perform the sampling processing at the sampling points SP1, SP4, SP7, SP10, SP13, SP16, SP19 and so on in a sampling period of 3×T.

The third MCU 203 executes, at Step S622, the jump instruction at the address next to the "queue read instruction" in the program memory 212 to jump to the third execution start address No. "20" (hexadecimal number) loaded (received) at Step S621. Then, the third MCU 203 executes, at Step S623, the standby instruction at the third execution start address No. "20" (hexadecimal number) to stand by for a time of about T in FIG. 3, and executes the standby instruction at the next address No. "30" (hexadecimal number) to stand by for a time of about T in FIG. 3. Namely, the third MCU 203 stands by for a time of about 2×T in FIG. 3 at Step S623. Then, the third MCU 203 executes, at Step S624, the sampling processing (data processing) instruction at the next address No. "40" (hexadecimal number) to perform the sampling processing (data processing) at the sampling point SP2 (FIG. 3) of the sensing data D1, and outputs the transmission data D2 to the RF circuit 115. Then, the third MCU 203 executes, at Step S625, the standby instruction at the next address in the program memory 212 to stand by for a time of about 3×T in FIG. 3. Thereafter, the third MCU 203 executes the "instruction to jump to No. 40 (hexadecimal number)" at the next address in the program memory 212 to jump to No. 40 (hexadecimal number). Then, the third MCU 203 returns to Step S624 and executes the sampling processing (data processing) instruction at No. 40 (hexadecimal number) to perform the sampling processing (data processing) at the sampling point SP5 (FIG. 3) of the sensing data D1, and outputs the transmission data D2 to the RF circuit 115. Then, the third MCU 203 executes, at Step S625, the standby instruction at the next address in the program memory 212 to stand by for a time of about 3×T in FIG. 3. Thereafter, the third MCU 203 executes the "instruction to jump to No. 40 (hexadecimal number)" at the next address in the program memory 212 to jump to No. 40 (hexadecimal number). Then, the third MCU 203 returns to Step S624 and executes the sampling processing (data processing) instruction at No. 40 (hexadecimal number) to perform the sampling processing (data processing) at the sampling point SP8 (FIG. 3) of the sensing data D1, and outputs the transmission data D2 to the RF circuit 115. Hereinafter, by repeating the same processing as described above, the third MCU 203 performs the sampling processing (data processing) at the sampling points SP11, SP14, SP17 and so on (FIG. 3) of the sensing data D1, and outputs the transmission data D2 to the RF circuit 115. As described above, the third MCU 203 can perform the sampling processing at the sampling points SP2, SP5, SP8, SP11, SP14, SP17 and so on in a sampling period of 3×T.

As described above, the MCU group 114 can perform the sampling processing at the sampling points SP0 to SP19 and so on in the sampling period of T by the parallel processing by the plurality of MCUs 201 to 203. The plurality of MCUs 201 to 203 are mutually the same in the period of 3×T of repeatedly executing the sampling processing (data processing) instruction. The MCU group 114 repeats the above-described processing until the supply of the power P2 ends. Note that the number N of the MCUs 201 to 203 is not limited to three but may be two or more.

After sequentially accessing the queue 213, the plurality of MCUs 201 to 203 receive input of different execution start addresses from the queue 213 in the order of the sequential access, start execution of the instructions from the inputted different execution start addresses in the program memory 212, and repeatedly execute the sampling processing (data processing) instruction and the standby instructions. The plurality of MCUs 201 to 203 have mutually different timings to execute the sampling processing (data processing) instruction which are shifted from one another by the time of T.

The plurality of MCUs 201 to 203 are mutually different in the number of the standby instructions existing from the above-described different execution start addresses to the sampling processing (data processing) instruction. For example, the number of the standby instructions of the first MCU 201 is 0, the number of the standby instructions of the second MCU 202 is 1, and the number of the standby instructions of the third MCU 203 is 2.

The first MCU 201 starts execution from the sampling processing (data processing) instruction stored at the first execution start address No. "40".

The second MCU 202 starts execution from the standby instruction stored at the second execution start address No. "30" and then executes the sampling processing (data processing) instruction stored at the first execution start address No. "40" being the address next to the second execution start address No. "30".

The third MCU 203 starts execution from the standby instruction stored at the third execution start address No. "20", then executes the standby instruction stored at the second execution start address No. "30" being the address next to the third execution start address No. "20", and then executes the sampling processing (data processing) instruction stored at the first execution start address No. "40" being the address next to the second execution start address No. "30".

According to this embodiment, it is possible to shift the processings by the MCUs 201 to 203 by the time of T with a simple configuration without using complicated hardware or complicated software to make the timings for the MCUs 201 to 203 to execute the sampling processing (data processing) instruction different.

This makes it possible to reduce the hardware resources, reduce the number of instructions to be stored in the program memory 212, and shift the sampling processings (data processings) of the MCUs 201 to 203 by desired timing.

Further, since the queue 213 is accessed only at startup, the power consumption can be suppressed by turning off the power supply after it is accessed from all of the MCUs 201 to 203.

Second Embodiment

FIG. 7 is a diagram illustrating a configuration example of an MCU group 114 according to a second embodiment. Hereinafter, the points that this embodiment is different from the first embodiment will be described. A fourth MCU 204 has the same configuration as those of the MCUs 201 to 203, and is connected to the bus 211. In this embodiment, the number of required MCUs is three, but four MCUs 201 to 204 are provided taking into account fault tolerance. The program memory 212 stores a stop instruction at a fourth execution address No. "FF" (hexadecimal number). The storage part 402 in the queue 213 stores the fourth execution address No. "FF" (hexadecimal number) at an entry number "3". For example, when the supply of the power P2 is started, the MCUs 201 to 204 access the queue 213 at about the same time as in the first embodiment. For example, the control part 401 in the queue 213 firstly accepts the access from the first MCU 201, secondly accepts the access from the second MCU 202, thirdly accepts the access from the third MCU 203, and fourthly accepts the access from the fourth MCU 204. In this case, the processings by the MCUs 201 to 203 are the same in those of the first embodiment. Hereinafter, the processing by the fourth MCU 204 will be described.

When the fourth MCU 204 accesses the queue 213, the control part 401 in the queue 213 loads the entry number "3" stored in the offset register 403. Then, the control part 401 in the queue 213 loads from the storage part 402 the fourth execution start address No. "FF" (hexadecimal number) stored at the loaded entry number "3" in the storage part 402, and transmits the fourth execution start address No. "FF" to the fourth MCU 204. Upon receiving it, the fourth MCU 204 executes the jump instruction next to the "queue read instruction" in the program memory 212 to jump to the above-described received fourth execution start address No. "FF" (hexadecimal number). Then, the fourth MCU 204 executes the stop instruction at the fourth execution start address No. "FF" (hexadecimal number) to stop the processing and perform nothing. As described above, if all of the four MCUs 201 to 204 are normal, the fourth MCU 204 performs nothing, so that the data processor can perform the same sampling processing (data processing) as that in the first embodiment.

In contrast, when one of the four MCUs 201 to 204 fails, the three normal MCUs access the queue 213 and the one failed MCU does not access the queue 213. As a result, the one failed MCU performs nothing and the three normal MCUs can perform the same sampling processings (data processings) as those of the MCUs 201 to 203 in the first embodiment. Note that though the case where one redundant MCU 204 is provided with respect to the required number of MCUs has been described as an example in this embodiment, two or more redundant MCUs may be provided.

According to this embodiment, even if a failed MCU arises among the plurality of MCUs, the remaining normal MCUs can perform normal sampling processings (data processings). Providing equal to or more than required number of MCUs enables improvement of fault tolerance.

It should be noted that the above embodiments merely illustrate concrete examples of implementing the present invention, and the technical scope of the present invention is not to be construed in a restrictive manner by these embodiments. That is, the present invention may be implemented in various forms without departing from the technical spirit or main features thereof.

It is possible to make timings for a plurality of controllers to execute a data processing instruction different with a simple configuration.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A data processor, comprising:
    a plurality of controllers that process data;
    a program memory that stores a standby instruction and a data processing instruction at a plurality of addresses respectively; and
    a queue that stores different execution start addresses for the plurality of controllers,
    wherein after the plurality of controllers sequentially access the queue, the plurality of controllers acquire the different execution start addresses from the queue in an order of the sequential access, start execution of instructions from the acquired different execution start addresses in the program memory, and execute the data processing instruction and execute the standby instruction the number of times different for each of the controllers.

2. The data processor according to claim 1,
    wherein the plurality of controllers are mutually same in period of repeatedly executing the data processing instruction.

3. The data processor according to claim 1,
    wherein the queue comprises:
    a storage part that stores the different execution start addresses for the plurality of controllers at a plurality of entry numbers;
    an offset register that stores the entry number in the storage part; and
    a control part that reads, when sequentially accessed from the plurality of controllers, the execution start address from the entry number stored in the offset register in the storage part, outputs the read execution start address to the accessing controller, and overwrites the entry number stored in the offset register with a next entry number.

4. The data processor according to claim 3,
    wherein when the control part is accessed from the controller, the control part increments the entry number stored in the offset register.

5. The data processor according to claim 1,
    wherein the program memory stores the data processing instruction at a first execution start address, and stores the standby instruction at a second execution start address,
    wherein a first controller of the plurality of controllers starts execution from the data processing instruction stored at the first execution start address, and wherein a second controller of the plurality of controllers starts execution from the standby instruction stored at the second execution start address, and then executes the data processing instruction stored at the first execution start address being an address next to the second execution start address.

6. The data processor according to claim 5,
wherein the program memory stores the standby instruction at a third execution start address, and
wherein a third controller of the plurality of controllers starts execution from the standby instruction stored at the third execution start address, then executes the standby instruction stored at the second execution start address being an address next to the third execution start address, and then executes the data processing instruction stored at the first execution start address being an address next to the second execution start address.

7. The data processor according to claim 5,
wherein the program memory stores the standby instruction at an address next to the first execution start address, and stores an instruction to jump to the first execution start address at an address next thereto.

8. The data processor according to claim 5,
wherein the program memory stores a stop instruction at a fourth execution start address, and
wherein a fourth controller of the plurality of controllers executes the stop instruction stored at the fourth execution start address.

\* \* \* \* \*